(12) United States Patent
Wu et al.

(10) Patent No.: US 7,003,594 B2
(45) Date of Patent: Feb. 21, 2006

(54) STREAMING PROTOCOL FOR STORAGE DEVICES

(75) Inventors: Chia Y. Wu, Newark, CA (US); Whay Sing Lee, Newark, CA (US); Nisha D. Talagala, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 34 days.

(21) Appl. No.: 10/435,839

(22) Filed: May 12, 2003

(65) Prior Publication Data

US 2004/0230719 A1    Nov. 18, 2004

(51) Int. Cl.
*G06F 3/00*    (2006.01)

(52) U.S. Cl. .............................. 710/29; 710/30; 710/31; 710/32; 710/33; 710/34; 710/58

(58) Field of Classification Search .................. 710/30, 710/31, 32, 33, 34, 58, 29
See application file for complete search history.

(56) References Cited

U.S. PATENT DOCUMENTS

| | | | |
|---|---|---|---|
| 5,689,646 A | 11/1997 | Thorson | 395/200.15 |
| 5,689,661 A | 11/1997 | Hayashi et al. | 395/311 |
| 5,701,416 A | 12/1997 | Thorson et al. | 395/200.15 |
| 5,720,025 A | 2/1998 | Wilkes et al. | 395/182.04 |
| 5,737,628 A | 4/1998 | Birrittella et al. | 395/800.11 |
| 5,970,232 A | 10/1999 | Passint et al. | 395/200.68 |
| 6,016,510 A | 1/2000 | Quattromani et al. | 709/233 |
| 6,021,440 A * | 2/2000 | Post et al. | 709/231 |
| 6,023,753 A | 2/2000 | Pechanek et al. | 712/18 |
| 6,055,618 A | 4/2000 | Thorson | 712/11 |
| 6,101,181 A | 8/2000 | Passint et al. | 370/352 |
| 6,167,502 A | 12/2000 | Pechanek et al. | 712/15 |
| 2002/0156973 A1 * | 10/2002 | Ulrich et al. | 711/114 |
| 2002/0178143 A1 * | 11/2002 | Fujimoto | 707/1 |
| 2002/0191543 A1 * | 12/2002 | Buskirk et al. | 370/230.1 |
| 2003/0163590 A1 * | 8/2003 | Cheng | 709/250 |

FOREIGN PATENT DOCUMENTS

| | | |
|---|---|---|
| EP | 0 785 512 | 7/1997 |
| WO | 99/26429 | 5/1999 |

OTHER PUBLICATIONS

Stevens, Richard W., TCP/IP Illustrated, The Protocols; 1994; Addison Wesley Longman, Inc, vol. 1.*

Bradley Kuszmaul, Mercury Computer Systems, Inc., "The RACE Network Architecture," (posted at www.mc.com/techlit/#tech_brief prior to this), 6 pages.

(Continued)

*Primary Examiner*—Kim Huynh
*Assistant Examiner*—Alan S. Chen
(74) *Attorney, Agent, or Firm*—Robert C. Kowert; Meyertons, Hood, Kivlin, Kowert & Goetzel, P.C.

(57) ABSTRACT

Various embodiments of systems and methods for implementing a streaming I/O protocol are disclosed. In some embodiments, a method may involve: receiving a packet initiating a streaming write operation, where the packet indicates that the size of the streaming write is larger than the size of the packet; initiating a write access having a size larger than the size of the packet to a storage device; receiving subsequent packets included in the streaming write operation; and writing data received in the subsequent packets to the storage device as part of the write access initiated in response to the earlier packet. In some embodiments, streaming read operations may also be supported.

26 Claims, 4 Drawing Sheets

OTHER PUBLICATIONS

R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD-98-1031, 16 pages.

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874-902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D-I, vol. J83D-I, No. 11, Nov. 2000, pp. 1143-1153.

Milan Kovacevic, Center for Telecommunications Research, "On Torus Topologies with Random Extra Links," IEEE 1996, pp. 410-418.

Dally, et al., The Torus Routing Chip, Distributed Computing, Springer-Verlag 1986, pp. 187-196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product-info/mpp/T3D_Architecture_Over/T3D.overview.html, Cray Research, 1993, 40 pages.

Marco Fillo, et al., "The M-Machine Multicomputer," Laboratory for Computer Science, Massachusetts Institute of Technology, A.I. Memo No. 1532, Ann Arbor,. Mar. 1995, 14 pages.

Noakes, et al., "The J-Machine Multicomputer: An Architectural Evaluation," Proceedings of the 20th International Symposium on Computer Architecture, May 1993, 12 pages.

Dally, et al., "Architecture of a Message-Driven Processor," International Conference on Computer Architecture, Jun. 1987, pp. 189-196.

Dennison, Lee and Dally, "High-Performance Bidirectional Signalling in VLSI," Massachusetts Institute of Technology, Oct. 12, 1992, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High-Performance Communication Substrate for Parallel Computers," Proceedings of the First International Parallel Computer Routing and Communication Workshop, Seattle WA, May 1994, 15 pages.

Dennison, et al., "Low-Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Trees, Hypercubes," F. Thomsom Leighton, Morgan Kaufmann Publishers, 1992, pp. 1-831.

Christopher J. Glass and Lionel Ni, "Fault-Tolerant Wormhole Routing in Meshes," Technical Report, MSU-CPS-ACS-72, Oct. 30, 1992 (revised May 25, 1993), 28 pages.

Stefan Savage and John Wilkes, "AFRAID—A Frequently Redundant Array of Independent Disks," Proceedings of the 1996 USENIX Technical Conference, pp. 27-39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU-CPS-ACS-44, Oct. 10, 1991 (revised Mar. 2, 1992), pp. 278-287 (numbered herein as 1-20).

Thomas Stricker, "Message Routing on Irregular 2D-Meshes and Tori," School of Computer Science, Carnegie Mellon Univ., Jan. 15, 1991, pp. 170-177 (numbered herein as 1-19).

Dally, et al., "The J-Machine: A Restrospective," in 25 Years of the International Symposia on Computer Architecture—Selected Papers. pp. 54-58.

* cited by examiner

STREAMING PROTOCOL FOR STORAGE DEVICES

BACKGROUND

1. Field of the Invention

This invention relates to computer systems and, more particularly, to storage devices used within a computer system.

2. Description of the Related Art

When a network handles packets of different sizes, undesirable traffic patterns may arise and network performance may consequentially degrade. Accordingly, the aggregate performance of a network is typically improved when the size of a network packet is fixed. Ideally, a relatively small fixed packet size is selected in order to allow further performance enhancements such as fine-grained load-balancing and the multiplexing of network traffic. Implementing a smaller fixed packet size may also limit the worst-case performance a network packet must sustain.

Unfortunately, the performance of certain networked components may benefit from larger sized network packets. For example, disk drive performance is typically better when accesses span large ranges of data. If disk drives are coupled to a host by a network, use of a small network packet size may limit the performance of the disk drives by subdividing the data for each disk I/O operation into multiple network packets. When successive packets specify sequential disk locations, the amount of time needed for the disk controller to process each packet may exceed the amount of time taken to for the next disk location to rotate past the disk's read or write head. Since performance of the command specified in the packet will be delayed until the disk location is again positioned where it can be accessed by the read or write head, handling of such packets may undesirably affect disk performance.

SUMMARY

Various embodiments of systems and methods for implementing a streaming I/O protocol are disclosed. In some embodiments, a method may involve: receiving a packet initiating a streaming write operation, where the packet indicates that the size of the streaming write is larger than the size of the packet; initiating a write access having a size that is larger than the size of the packet to a storage device; receiving subsequent packets included in the streaming write operation; and writing data received in the subsequent packets to the storage device as part of the write access initiated in response to the earlier packet. In some embodiments, streaming read operations may also be supported.

One embodiment of a system may include a network, an initiating device, a storage controller, and a storage device. The initiating device may be configured to send a packet containing size information followed by one or more additional packets on the network. The size information may indicate that the size of a streaming write operation requested by the packet is larger than the size of the packet. The storage controller may be coupled to receive the packet and the additional packets from the network. The storage controller may be configured to initiate a write access having a size that is larger than the size of the packet to the storage device in response to receiving the packet that includes the size information. The storage controller may be configured to write data included in the additional packets to the storage device as part of the write access initiated in response to the packet.

In one embodiment, the storage controller may be configured to verify that the additional packets are received in order and to return an error indication to the initiating device if any of the additional packets are received out of order. If an error indication is provided to the initiating device, the initiating device may be configured to resend the packet indicating the streaming write size and the additional packets. If the storage controller receives a packet requesting an additional write access to the storage device prior to completion of the write access, the storage controller may be configured to inhibit performance of the additional write operation until completion of the write access.

Another embodiment of a system may include a storage device and a storage device controller coupled to the storage device. The storage device controller may be configured to receive a packet requesting a streaming write access and one or more additional packets, where the packet indicates that the write access size is larger than the packet size. In response to receiving the packet, the storage device controller may be configured to initiate a write access to the storage device, where the write access is of a size that is larger than the size of the packet. In response to receiving the additional packets, the storage device controller may be configured to write data included in the additional packets to the storage device as part of the write access initiated in response to receiving the packet.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
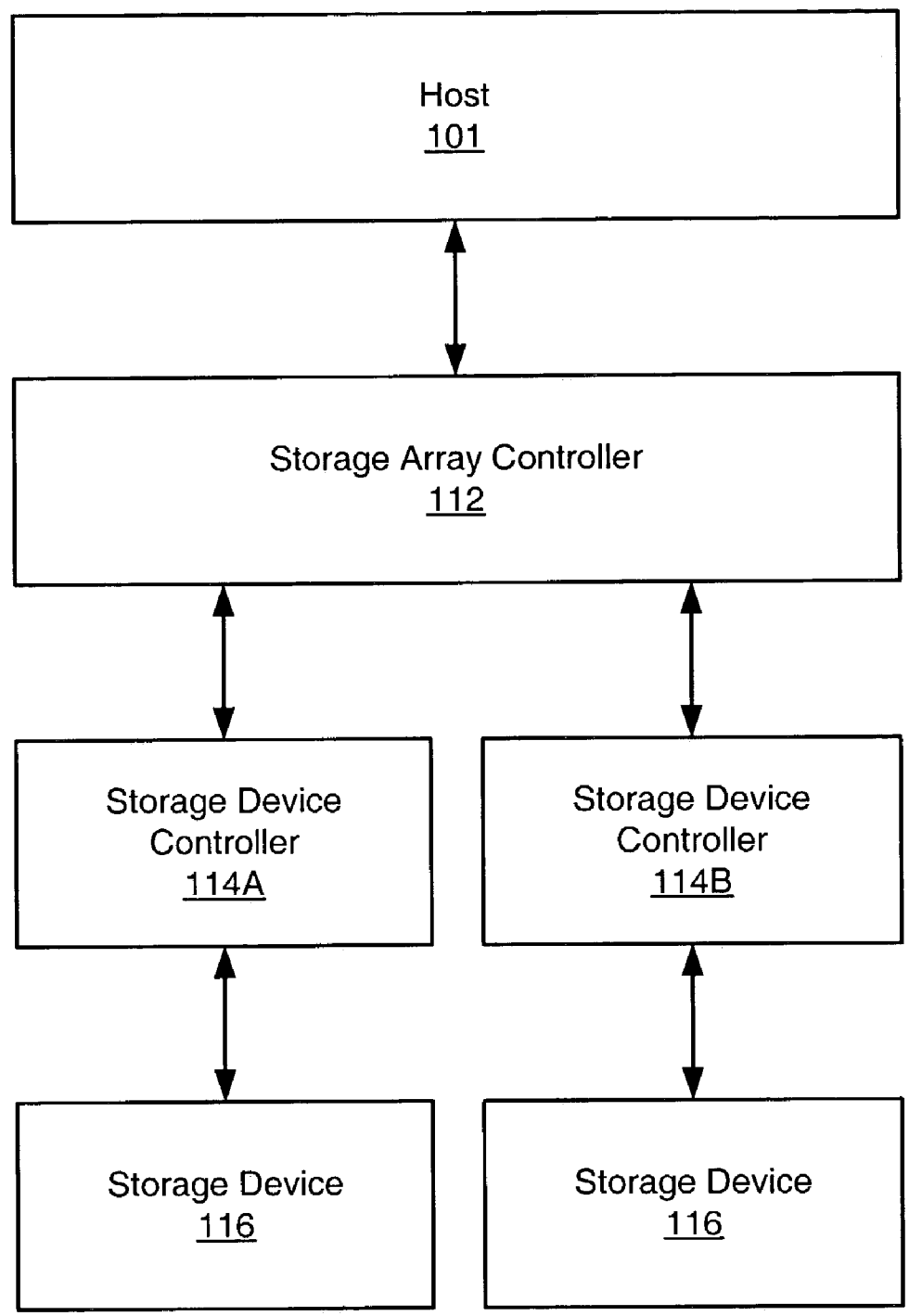
FIG. 1 is a block diagram of a data processing system, according to one embodiment.

FIG. 1 illustrates an embodiment of a data processing system 100. Data processing system 100 includes at least one host 101, at least one storage array controller 112, several storage device controllers 114 and associated storage devices 116. Host 101 may be connected to array controller 112 by various interconnects including, for example, a local bus, a network connection, an interconnect fabric, or a communication channel. The storage system that includes array controller 112, storage device controllers 114, and storage devices 116 may be a RAID (Redundant Array of Independent Disks) storage subsystem or other type of storage array (e.g., a JBOD or Just A Bunch of Disks array). In some embodiments, several hosts 101 may be in communication with the storage system. Similarly, data processing system 100 may include multiple storage systems, and thus may include multiple array controllers 112, storage device controllers 114, and storage devices 116.

Storage devices 116A–116B may be, for example, magnetic hard disk drives, optical drives, magneto-optical drives, tape drives, solid state storage, or other non-volatile memory. It is noted that the term "storage device" refers to any semi-permanent or permanent storage place for digital data that is not memory. Memory is a temporary workspace for executing instructions and processing data. To emphasize this distinction, storage devices 116 may also be referred to as non-temporary storage devices. A storage device 116 may be any peripheral storage device that holds, reads, and writes magnetic or optical disks or any other suitable storage media. A storage device may be a receptacle for disk cartridges, disk packs or floppy disks, or it may contain non-removable disk platters like most personal computer hard disks.

Device controllers 114 may be specific to the particular type of an associated storage device and, in some embodiments, integrated in the same housing as an associated storage device 116. The storage devices 116 are examples of means for storing data. Note that the number of storage devices 116 in other embodiments may vary.

Array controller 112 may take many forms, depending on the design of the storage system. In some systems, array controller 112 may only provide simple I/O connectivity between host 101 and storage device controllers 114 and the array management may be performed by host 101. In other embodiments of a storage system, such as controller-based RAID systems, array controller 112 may also include a volume manager to provide volume management, data redundancy, and file management services. In other embodiments of the present invention, the volume manager may reside elsewhere in data processing system 100. For example, in software RAID systems, the volume manager may reside on host 101 and be implemented in software. In other embodiments, the volume manager may be implemented in firmware that resides in a dedicated controller card on host 101. In yet other embodiments, more than one array controller 112 may be provided in the storage system to provide for redundancy and/or performance improvements.

Various portions of a data processing system 100 such as the one shown in FIG. 1 may be interconnected by a network that transfers data in packets. For example, in one embodiment, hosts 101 may be coupled to array controllers 112 by a network. In other embodiments, hosts 101, array controllers 112, and storage device controllers 114 may be coupled by such a network. As used herein, a "packet" is a communication that may be independently routed through a network coupling the host 101, array controller 112, and/or storage device controllers 114. In some embodiments, the size of each packet may be fixed.

The size of packets transmitted in a network coupling components of the data processing system 100 may be smaller than the size of typical storage device I/O operations initiated by host 101. Accordingly, more than one packet may need to be conveyed over the network in order to perform each storage device I/O. Array controller 112, storage device controllers 114, and/or storage devices 116 may each participate in a streaming transfer protocol to handle storage device I/O operations that include more than one network packet. According to the streaming protocol, a device initiating a streaming I/O write operation may send a packet requesting the I/O write and indicating that the size of the I/O write is larger than the packet size. In response, a device performing the streaming I/O write may initiate an I/O write of a size larger than the packet size. As subsequent packets implementing the streaming I/O write are received from the initiating device, the device performing the streaming I/O write may write the data included in those packets to the storage device as part of the earlier-initiated write.

Figure 2:
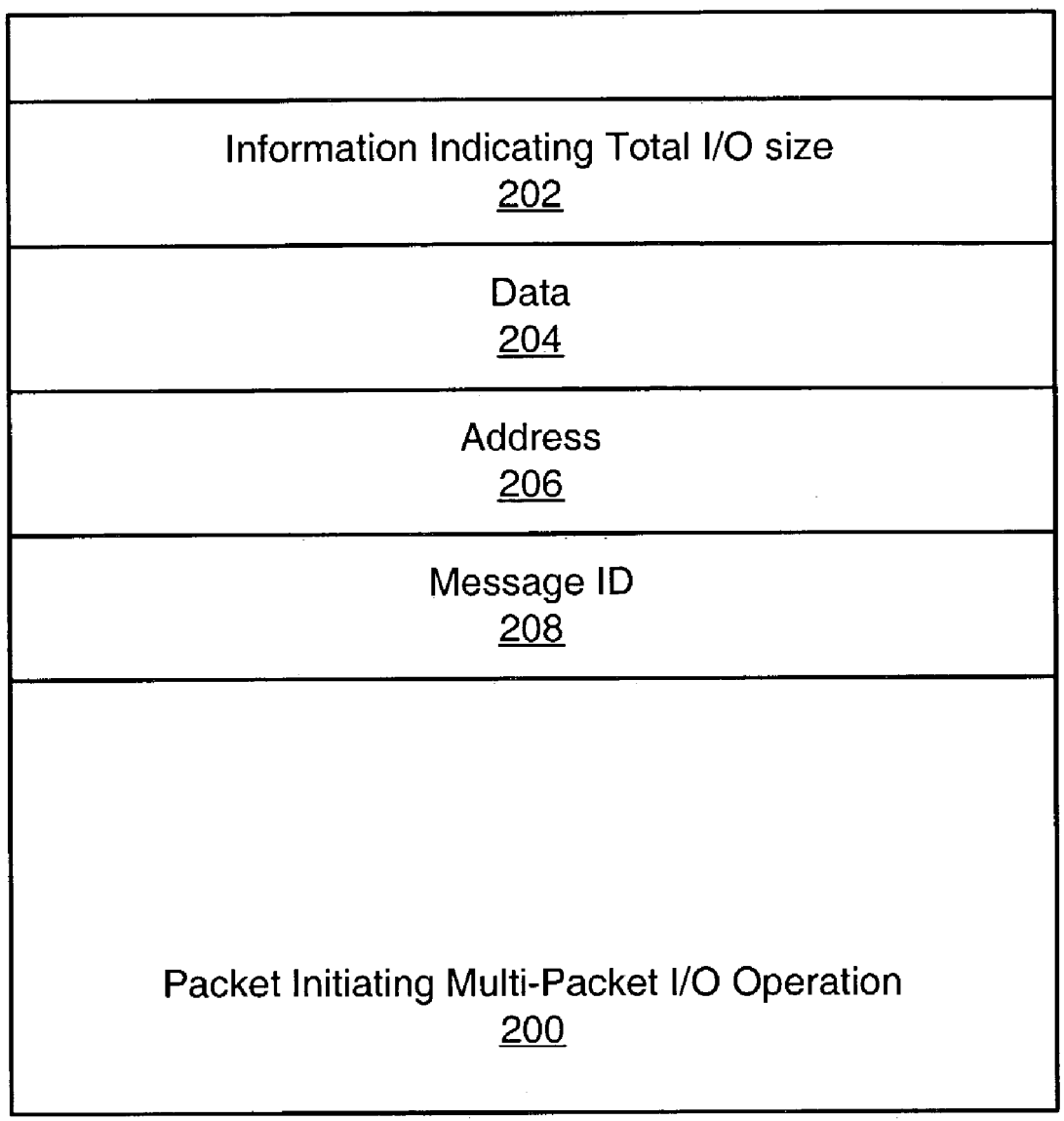
FIG. 2 illustrates an exemplary packet that may be sent in one embodiment.

FIG. 2 illustrates a packet 200 that may be sent when initiating an I/O write operation. The packet 200 may include a command indicating that a write is requested as well as addressing information 206 indicating the storage location(s) to be written. In some embodiments, the first packet may also include a portion 204 of the data to be written by the streaming I/O operation. In the streaming protocol, the first packet may include information 202 indicating that the size of the I/O operation is larger than the size of an individual packet. As shown in FIG. 2, the size information 202 included in the packet 200 may indicate the total size of the write requested. The size information 202 may indicate the size in bytes or number of packets in some embodiments. Based on the size information, a storage controller such as array controller 112 or storage device controller 114 may initiate an I/O operation of larger size than the size of each individual packet. As subsequent packets in that I/O operation are received, the storage controller may send that data as part of the already-initiated I/O operation. The other packets sent as part of the I/O write operation may each include a portion of the data to be written. These other packets may not include size information 202 for the I/O operation. In some embodiments, each of the packets, including packet 200, may include a message ID 208. The message IDs 208 may be used to determine the order of the packets and/or to detect whether packets are received out of order, as described in more detail below.

Note that in some embodiments, more than one write may be initiated to the storage device in response to a single host- or array controller-initiated streaming write. However, each write to the storage device may be of a larger size than each individual packet.

A streaming protocol I/O operation may be performed by a storage device controller 114 in response to host- or storage array controller-initiated multi-packet I/O operations. In embodiments in which storage devices are coupled directly to host 101, storage device controllers 114 may implement the streaming protocol in response to host-initiated operations. Similarly, such a streaming protocol may be implemented by a storage device controller 114 that receives multiple packets implementing a write I/O operation from a storage array controller 112. A storage array controller 112 may similarly perform a streaming protocol I/O operation to a storage array in response to a host-initiated multi-packet I/O operation. Storage device controller 114 and array controller 112 are examples of means for receiving a packet initiating a streaming I/O operation. By implementing a streaming protocol, some embodiments may support both small network packet size and large I/O size, potentially increasing the performance of the network and/or the storage devices 116.

A storage device controller 114 or array controller 112 that implements a streaming protocol may be configured to perform the I/O operation in a pipelined manner (e.g., data from one packet may be written to the storage device at the same time that the storage device controller 114 is processing the next packet). In some embodiments, the streaming protocol may be implemented without the storage device controller 114 or array controller 112 buffering all of the packets prior to sending data contained in the packets as part of the I/O operation to the storage device 116. Individual packets may be temporarily buffered (e.g., to implement speed or bandwidth matching between different interconnects) by the storage device controller 114 or array controller 112, but the data for the entire I/O may not all be buffered at the same time.

In some embodiments, a storage device controller 114 may have several outstanding streaming protocol I/O operations (e.g., several read operations) at the same time. In other embodiments, storage controllers may limit the number of outstanding I/O operations. For example, in embodiments in which multiple outstanding streaming protocol write operations may cause errors, each storage controller may be configured to have only one outstanding streaming protocol write operation at a time. The host 101 or storage array controller 112 initiating I/O operations may be configured to limit the number of outstanding operations targeting to a particular storage device. For example, the host 101 or storage array controller 112 may be configured to not initiate another I/O operation until any previously-initiated I/O operations have completed. Alternatively, the storage device controller 114 may be configured to either generate an error or timeout the new I/O operation or perform the new I/O operation in a non-streaming fashion (i.e., in which an independent storage device I/O is initiated for each packet) if another I/O operation is requested while a streaming protocol I/O operation is outstanding.

In one embodiment, the storage device controller 114 may compare information in each packet to determine if each packet is part of an ongoing streaming protocol I/O operation. If this information indicates that a packet is not part of the current streaming I/O operation, the storage device controller 114 may generate an error indication or discard the packet. Discarding the packet may cause the operation initiated by that packet to timeout at the initiating device. The storage device controller 114 may determine that a packet is not part of the current streaming I/O operation by comparing information identifying the initiating device in that packet to the initiating device information for the current I/O operation. If no streaming I/O operation is currently ongoing when a packet is received, the storage device controller 114 may initiate an I/O operation in response to that packet.

Storage device controller 114 may also verify that the individual packets implementing a streaming I/O operation are received in the correct order. For example, each packet may include a message ID 208, as shown in FIG. 2. The relationship between message IDs 208 in different packets may indicate whether the relative order in which those packets were sent. The storage device controller 114 may examine the message ID received in each packet to determine whether the packets are being received in order. If an out-of-order packet is received, the storage device controller 114 may generate an error indication or timeout the current streaming protocol I/O operation. Storage device controller 114 may similarly timeout or generate an error indication for a streaming protocol I/O operation if a packet within a streaming I/O operation is not received within a timeout period. For example, if interconnect congestion delays the third packet in a streaming I/O operation for longer than a timeout period (which may be initiated when the storage device controller 114 begins handling that streaming I/O operation), the storage device controller 114 may fail or timeout the streaming I/O operation. Failing the streaming I/O operation may involve sending a packet to the initiator indicating the failure, while timing out the streaming I/O operation may simply involve not forwarding any additional packet in that I/O operation to the storage device, causing the I/O operation to eventually time out at the initiator. If a streaming I/O operation is not completed (e.g., indicated by the storage device sending an explicit error message or by the streaming I/O timing out), the initiating device may retry the entire streaming I/O operation.

Streaming protocol I/O operations may be performed for both read and write operations in some embodiments. A read operation may be initiated by a host 101 or storage array controller 112 sending a single packet requesting the read. In response, the storage device controller 114 receiving the packet may initiate a single read operation. As read data is received by that storage device controller 114 from the storage device 116, the read data may be subdivided into several packets for transmission to the initiating device. Note that in other embodiments, only write operations may be performed according to the streaming protocol. Read operations may be performed in a non-streaming manner by sending one read initiating packet for each read data packet that will be responsively returned to the host or storage array controller initiating the read.

In some embodiments, both streaming and non-streaming operations may be implemented. The storage device controller 114 may initiate an independent access to the storage device 116 each time a packet requesting a non-streaming operation is received. The storage device controller 114 may determine whether a packet requests a streaming or non-streaming I/O operation based on information included in the packet. For example, a packet requesting a write may include information indicating whether the write is a streaming write or a non-streaming write. This information may be indicated in the command encoding in some embodiments. In other embodiments, size information included in the packet may indicate whether the packet is requesting a streaming or non-streaming operation. For example, if the amount of data targeted by a write request is less than or equal to the amount of data that can be conveyed in a single packet, the storage device controller 114 may determine that a non-streaming I/O operation is being requested. If instead the size information indicates that the targeted amount of data is greater than the amount of data that may be included in a single packet, the storage device controller 114 may determine that a streaming I/O operation is being requested. If a packet requesting a non-streaming I/O operation is received while a streaming I/O operation is being performed, the storage device controller 114 may discard the packet or generate an error indication to the initiating device that sent the packet.

Figure 3:
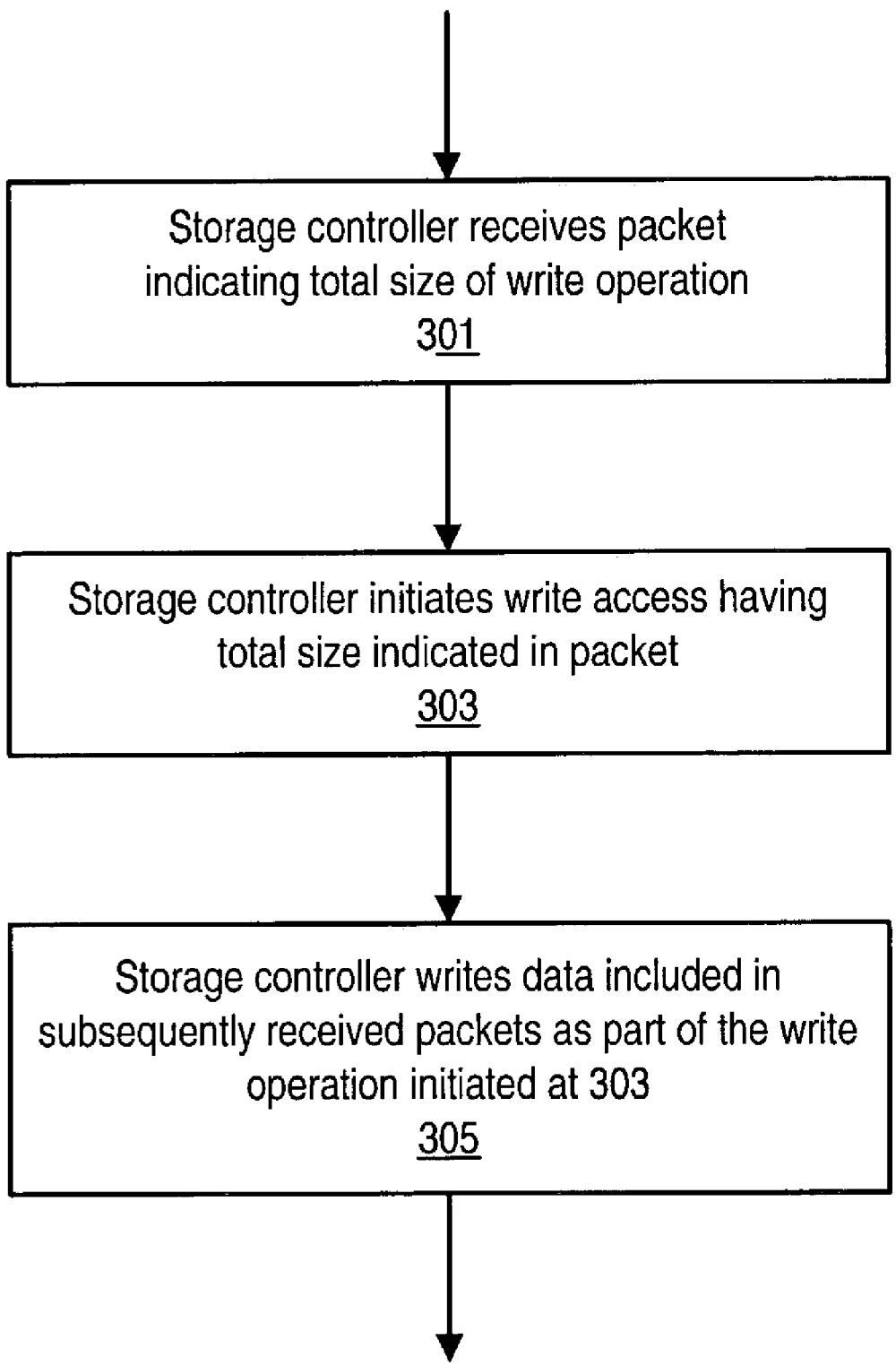
FIG. 3 shows a flowchart of a method of implementing a streaming write protocol between a controller and a storage device, according to one embodiment.

FIG. 3 is a flowchart of one embodiment of a method of implementing a write operation according to a streaming protocol. At 301, a storage device controller receives a packet initiating a write operation. The packet includes information indicating that the size of the write operation is larger than the size of a single packet. For example, the packet may indicate the total write operation size. In response, the storage device controller initiates a write access of the size indicated in that packet, as indicated at 303. As subsequent packets implementing that write operation are received by the storage device controller, the storage controller writes the write data included in those packets as part of the write access initiated at 303, as shown at 305. Streaming protocol read operations may be implemented similarly. For example, as part of a streaming read, a storage device controller may initiate a read access having a size larger than the packet size.

Figure 4:
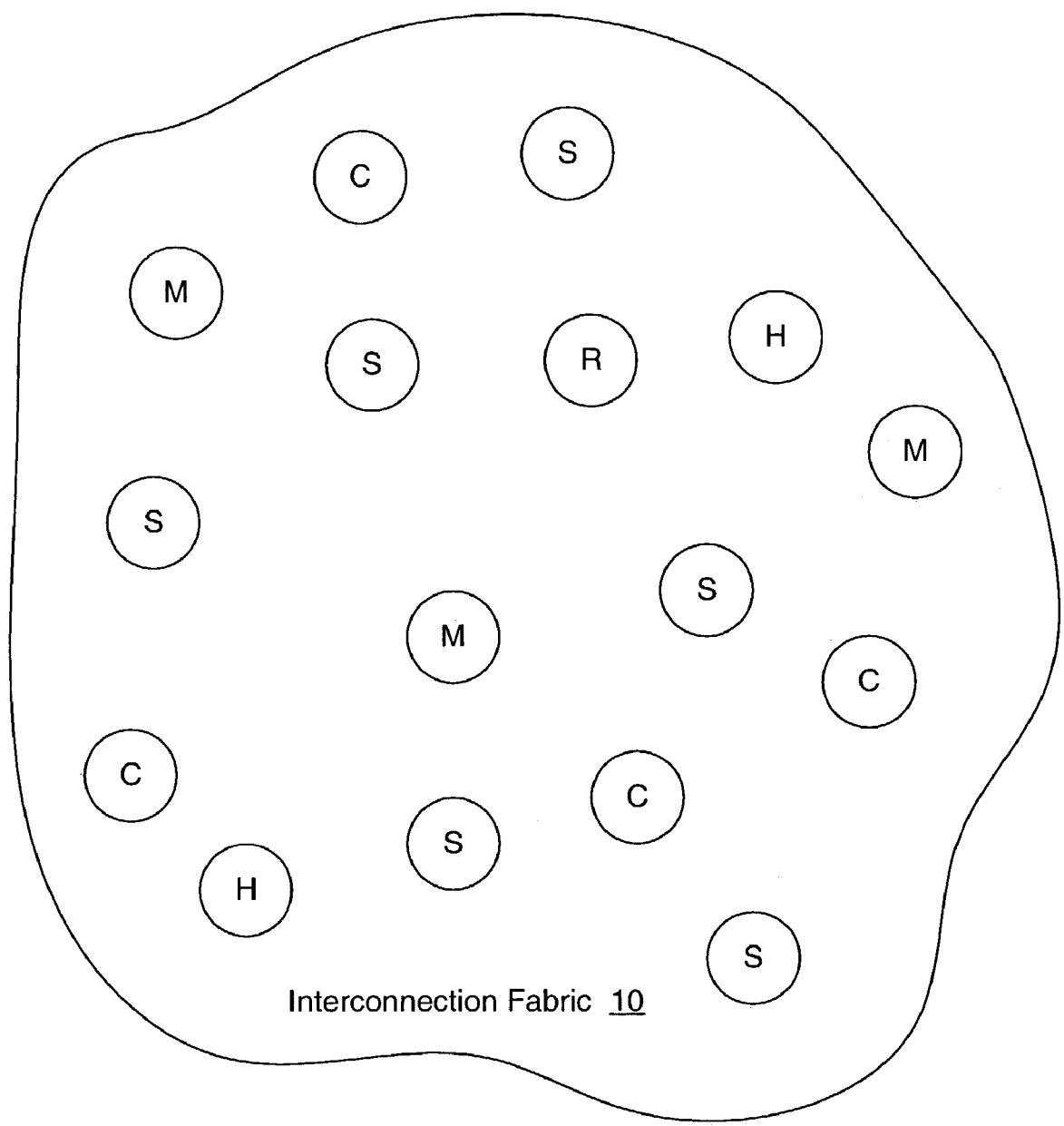
FIG. 4 illustrates an exemplary interconnect that may couple components in a storage system, according to one embodiment.

FIG. 4 illustrates a diagram of a storage system that includes several components, which are referred to as nodes, coupled by an interconnection fabric 10. Each node may implement one or more different types of devices in a storage system. Various different types of nodes may be configured to implement a streaming protocol as described above. In some embodiments, all of the nodes may implement such a streaming protocol.

The nodes are labeled with the letters C, H, M, R and S. A node with the letter C may be configured to support a controller such as a Redundant Array of Inexpensive Disks (RAID) controller. A node with the letter H may be configured with a host interface or line card that may serve as an interface to a host computer. A node with the letter R may be configured as a routing node to expand the communication paths available between other nodes. A node with the letter S may be configured as a mass storage node and may be connected to one or more mass storage devices such as hard disk drives. A node with the letter M may be configured as a storage cache memory node that provides, for example, a hierarchical storage cache for one or more mass storage nodes. Also, nodes may support any combination of these features. In other embodiments, there may be other configurations that have a fewer or greater number of nodes and the nodes may be configured and used differently. For example, there may be a fewer or greater number of S nodes and a fewer or greater number of H nodes.

Each node may be connected to each other node in the fabric 10 by multiple communication paths (not shown in FIG. 4). In some embodiments, each communication path may be completely independent of each other path. Redundant paths may exist such that there are multiple possible independent paths between any given pair of nodes. In embodiments that include multiple independent paths, different packets in the same streaming I/O operation may be routed on different paths through the fabric 10. A two or more dimensional torus or mesh fabric may be employed as the interconnection fabric 10 depicted in FIG. 4 in some embodiments.

In some embodiments, each node in the interconnect fabric may be configured to communicate with one or more random access memories, such as a hierarchical storage cache memory or other type of memory and a memory controller. In yet another embodiment, interface controller may be configured to communicate with a host or a RAID controller through a communication port, such as a peripheral component interface (PCI) bus. It is also contemplated that a node may have all of these functions or any combination of the above described functions.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method, comprising:
   receiving a packet initiating a streaming write operation, wherein the packet indicates that a size of the streaming write is larger than a size of the packet;
   initiating a write access having a size larger than the size of the packet to a storage device;
   receiving one or more subsequent packets included in the streaming write operation;
   writing data received in the one or more subsequent packets to the storage device as part of the write access initiated by said initiating;
   receiving a packet initiating a streaming read operation, wherein the streaming read operation indicates that a size of the streaming read operation is larger than a size of the packet initiating the streaming read operation;
   initiating a read access to the storage device having a size larger than the size of the packet initiating the streaming read operation;
   subdividing data output from the storage device in response to said initiating into a plurality of packets; and
   conveying the plurality of packets to an initiating device.

2. A method, comprising:
   receiving a packet initiating a streaming write operation, wherein the packet indicates that a size of the streaming write is larger than a size of the packet;
   initiating a write access having a size larger than the size of the packet to a storage device;
   receiving one or more subsequent packets included in the streaming write operation;
   writing data received in the one or more subsequent packets to the storage device as part of the write access initiated by said initiating;
   receiving an additional packet initiating an additional write operation to the storage device prior to completion of the write access; and
   inhibiting performance of the additional write operation until completion of the write access, wherein said inhibiting comprises causing the additional write operation to timeout.

3. The method of claim 2, wherein the packet initiating the streaming write operation indicates a total write size of the streaming write operation, and wherein said initiating comprises initiating a write access having the total write size.

4. The method of claim 2, wherein the packet indicates the total write size in bytes.

5. The method of claim 2, further comprising:
   receiving a packet initiating a streaming read operation, wherein the streaming read operation indicates that a size of the streaming read operation is larger than a size of the packet initiating the streaming read operation;
   initiating a read access to the storage device having a size larger than the size of the packet initiating the streaming read operation;
   subdividing data output from the storage device in response to said initiating into a plurality of packets;
   conveying the plurality of packets to an initiating device.

6. The method of claim 5, wherein the packet initiating the streaming read operation indicates a total size of the streaming read operation, and wherein said initiating a read access comprises initiating the read access having the total size indicated in the packet initiating the streaming read operation.

7. The method of claim 2, further comprising verifying an order of the one or more subsequent packets in response to receiving the one or more subsequent packets.

8. The method of claim 7, further comprising generating an error indication if any of the one or more subsequent packets are received out of order.

9. The method of claim 8, further comprising an initiating device resending the packet initiating the streaming write operation and the one or more subsequent packets in response to the error indication.

10. The method of claim 7, wherein said verifying the order of the one or more subsequent packets comprises comparing message IDs included in each of the one or more subsequent packets to determine an order in which an initiating device sent the one or more subsequent packets.

11. The method of claim 2, wherein the packet includes data to be written to the storage device as part of the write access.

12. A system, comprising:
   a network;
   an initiating device configured to send a packet containing size information followed by one or more additional packets on the network, wherein the size information indicates that a size of an operation requested in the packet is larger than a size of the packet;
   a storage controller coupled to receive the packet and the one or more additional packets from the network; and
   a storage device coupled to the storage controller, wherein the storage controller is a storage device controller, and wherein the storage device is a disk drive;
   wherein the storage controller is configured to initiate a write access to the storage device in response to receiving the packet containing the size information, wherein a size of the write access is larger than the size of the packet;
   wherein the storage controller is configured to write data included in the one or more additional packets to the storage device as part of the write access.

13. The system of claim 12, wherein the packet includes data to be written to the storage device as part of the write access.

14. The system of claim 12, wherein the size information indicates a total size of the operation requested in the packet, and wherein the storage controller is configured to initiate the write access having the total size.

15. The system of claim 14, wherein the packet indicates the total size in bytes.

16. The system of claim 12, wherein the initiating device is configured to send a packet containing information indicating a streaming read size on the network, and wherein the storage controller is configured to initiate a read access of the streaming read size to the storage device; wherein the storage controller is configured to subdivide data received in response to performance of the read access by the storage device into a plurality of packets and to send the plurality of packets to the initiating device via the network.

17. The system of claim 12, wherein the storage controller is configured to verify that the one or more additional packets are received in order.

18. The system of claim 17, wherein the storage controller is configured to return an error indication to the initiating device if any of the one or more additional packets are received out of order.

19. The system of claim 18, wherein in response to the error indication, the initiating device is configured to resend the packet indicating the streaming write size and the one or more additional packets.

20. The system of claim 18, wherein the storage controller is configured to verify the order of the one or more additional packets by comparing message IDs included in each of the one or more additional packets to determine an order in which the initiating device sent the one or more additional packets.

21. The system of claim 12, wherein if the storage controller receives a packet requesting an additional write access to the storage device prior to completion of the write access, the storage controller is configured to inhibit performance of the additional write operation until completion of the write access.

22. The system of claim 12, wherein the storage controller and the storage device are integrated in a same housing.

23. The system of claim 12, wherein the initiating device is an array controller.

24. A system, comprising:
   a network;
   an initiating device configured to send a packet containing size information followed by one or more additional packets on the network, wherein the size information indicates that a size of an operation requested in the packet is larger than a size of the packet;
   a storage controller coupled to receive the packet and the one or more additional packets from the network; and
   a storage device coupled to the storage controller;
   wherein the storage controller is configured to initiate a write access to the storage device in response to receiving the packet containing the size information, wherein a size of the write access is larger than the size of the packet;
   wherein the storage controller is configured to write data included in the one or more additional packets to the storage device as part of the write access;
   wherein the initiating device is configured to send a packet containing information indicating a streaming read size on the network, and wherein the storage controller is configured to initiate a read access of the streaming read size to the storage device; wherein the storage controller is configured to subdivide data received in response to performance of the read access by the storage device into a plurality of packets and to send the plurality of packets to the initiating device via the network.

25. A system, comprising:
   a network;
   an initiating device configured to send a packet containing size information followed by one or more additional packets on the network, wherein the size information indicates that a size of an operation requested in the packet is larger than a size of the packet;
   a storage controller coupled to receive the packet and the, one or more additional packets from the network; and
   a storage device coupled to the storage controller, wherein the storage controller is an array controller, and wherein the storage device is a storage array;
   wherein the storage controller is configured to initiate a write access to the storage device in response to receiving the packet containing the size information, wherein a size of the write access is larger than the size of the packet;
   wherein the storage controller is configured to write data included in the one or more additional packets to the storage device as part of the write access.

26. A system, comprising:
- a network;
- an initiating device configured to send a packet containing size information followed by one or more additional packets on the network, wherein the size information indicates that a size of an operation requested in the packet is larger than a size of the packet, wherein the initiating device is an array controller;
- a storage controller coupled to receive the packet and the one or more additional packets from the network; and
- a storage device coupled to the storage controller;
- wherein the storage controller is configured to initiate a write access to the storage device in response to receiving the packet containing the size information, wherein a size of the write access is larger than the size of the packet;
- wherein the storage controller is configured to write data included in the one or more additional packets to the storage device as part of the write access.

* * * * *